United States Patent [19]
Fujimoto et al.

[11] Patent Number: 6,089,087
[45] Date of Patent: Jul. 18, 2000

[54] METHOD FOR ADJUSTING THE TEMPERATURE CHARACTERISTIC OF A VIBRATING GYROSCOPE

[75] Inventors: Katsumi Fujimoto, Toyama-ken; Nobuyuki Ishitoko, Toyama, both of Japan

[73] Assignee: Murata Manufacturing Co., Ltd., Japan

[21] Appl. No.: 08/940,229

[22] Filed: Sep. 30, 1997

[30] Foreign Application Priority Data

Oct. 1, 1996 [JP] Japan .................................. 8-281345

[51] Int. Cl.$^7$ .................................................. G01C 19/00
[52] U.S. Cl. ................... 73/504.12; 73/503.3; 73/504.15
[58] Field of Search .......................... 73/504.12, 504.13, 73/504.02, 504.14–15, 504.08, 18, 503.3

[56] References Cited

U.S. PATENT DOCUMENTS

| | | | |
|---|---|---|---|
| 4,644,793 | 2/1987 | Church | 73/505 |
| 5,412,204 | 5/1995 | Nakamura | 250/231.12 |
| 5,824,899 | 10/1998 | Ebara et al. | 73/504.12 |
| 5,837,895 | 11/1998 | Fujimoto et al. | 73/504.12 |
| 5,847,279 | 12/1998 | Piazza | 73/504.16 |

FOREIGN PATENT DOCUMENTS 0629839 12/1994 European Pat. Off. .
0717263 6/1996 European Pat. Off. .

OTHER PUBLICATIONS

Patent Abstracts of Japan, vol. 015, No. 379 (E–1115), Sep. 25, 1991 & JP 03 150915 A (Murata Mfg Co Ltd), Jun. 27, 1991.

*Primary Examiner*—Benjamin R. Fuller
*Assistant Examiner*—Abdullahi Aw-Musse
*Attorney, Agent, or Firm*—Ostrolenk, Faber, Gerb & Soffen, LLP

[57] ABSTRACT

A vibrating gyroscope includes a vibration member in which first and second piezoelectric substrates are joined together. On the outside main surface of the first piezoelectric substrate, a first external electrode divided into six electrode sections is formed. On the outside main surface of the second piezoelectric substrate, a second external electrode is formed. By removing a part of the electrode sections disposed at the center, a capacitance difference C(L)–C(R) between the capacitance C(L) formed between one of the electrode sections disposed at the center and the second external electrode, and the capacitance C(R) formed between another electrode section disposed at the center and the second external electrode is adjusted.

13 Claims, 5 Drawing Sheets

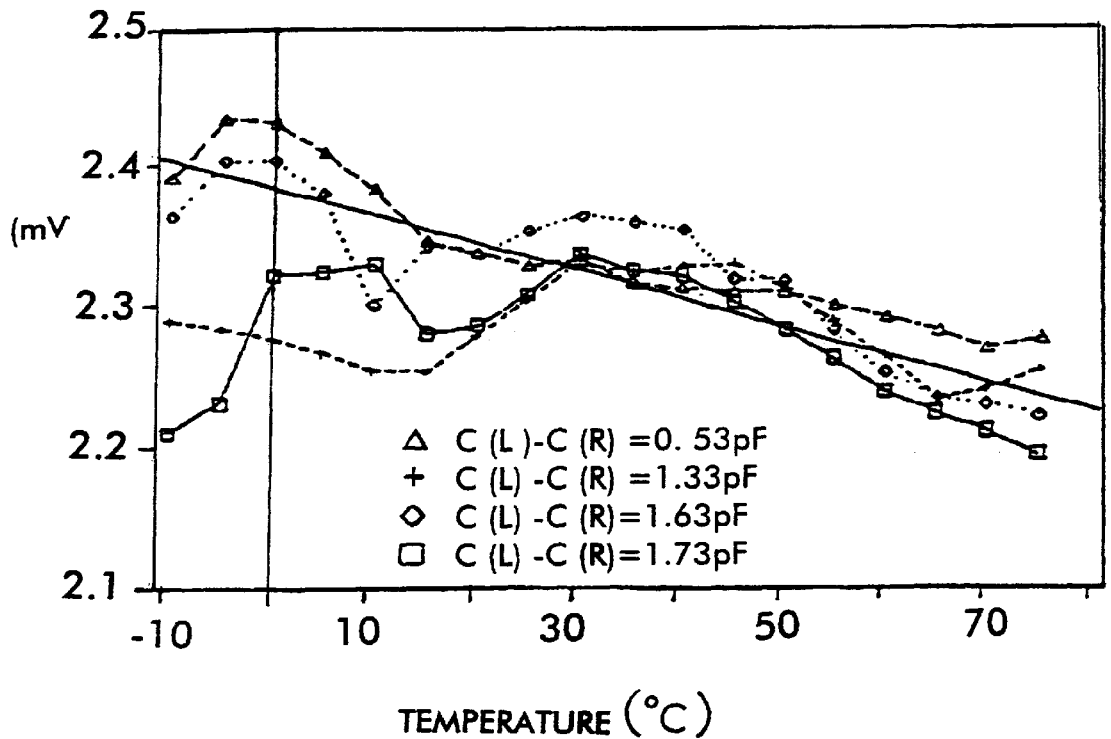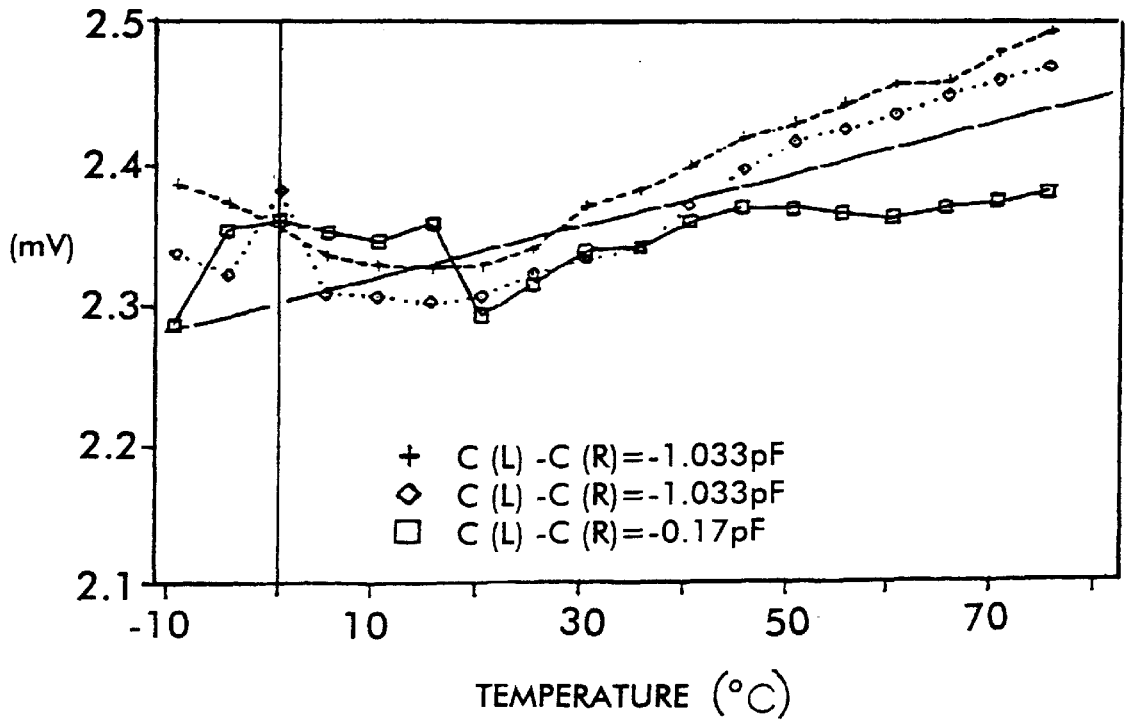

METHOD FOR ADJUSTING THE TEMPERATURE CHARACTERISTIC OF A VIBRATING GYROSCOPE

BACKGROUND OF THE INVENTION

1. Field of the Invention

The present invention relates to a method for adjusting the temperature characteristic of a vibrating gyroscope, and more particularly, to a method for adjusting the temperature characteristic of a vibrating gyroscope used for preventing camera shake or used in a car navigation system and a pointing device.

2. Description of the Related Art

FIG. 8 is a perspective view of a vibrating gyroscope serving as a background of the present invention. A vibrating gyroscope 1 includes a vibration member 2. The vibration member 2 is formed by joining a first piezoelectric substrate 3 and a second piezoelectric substrate 4. The first piezoelectric substrate 3 and the second piezoelectric substrate 4 are polarized in opposite directions to each other in the thickness direction as shown by arrows in FIG. 8.

On the outside main surface of the first piezoelectric substrate 3, a divided electrode 5 is formed. The electrode 5 is divided into two sections in the width direction by a groove extending in the longitudinal direction of the first piezoelectric substrate 3. The electrode 5 is further divided into three sections in the longitudinal direction by two grooves extending in the width direction of the first piezoelectric substrate 3. In this way, the electrode 5 is divided into six sections. On the whole surface of the outside main surface of the second piezoelectric substrate 4, another electrode 6 is formed.

In this vibrating gyroscope 1, a driving signal is applied between two electrode sections 5a and 5b disposed at the center in the longitudinal direction of the electrode 5 and the electrode 6, which is disposed opposite the electrode 5. Since the first piezoelectric substrate 3 and the second piezoelectric substrate 4 are polarized in opposite directions to each other, the vibration member 2 has a bimorph structure. When a driving signal is applied, the vibration member 2 bends and vibrates in the direction perpendicular to the surfaces on which the electrodes 5 and 6 are formed, with two nodes disposed a short distance inside from both ends in the longitudinal direction serving as center points. Since the electrode sections 5a and 5b output the same signal during vibration, if a difference is measured between the signals output from these electrode sections 5a and 5b, the difference is zero because the two output signals are offset.

When the vibration member 2 is rotated about its axis, a Coriolis force is generated in the direction perpendicular to the direction in which the vibration member 2 bends and vibrates. Therefore, the direction in which the vibration member 2 bends and vibrates changes, and the output signals of the electrode sections 5a and 5b vary. In other words, when the signal output from an electrode section 5a increases in response to the Coriolis force, the signal output from the other electrode section 5b decreases in response to the Coriolis force. Therefore, only the signal corresponding to the Coriolis force can be obtained from the difference of the output signals of these electrode sections 5a and 5b. In this way, by measuring a difference between the output signals of the electrode sections 5a and 5b, a rotation angular velocity which the vibrating gyroscope has is detected.

Such a vibrating gyroscope has, however, a temperature characteristic for each output as shown in FIG. 9. In other words, a drift voltage output from the vibrating gyroscope increases and decreases according to a change in ambient temperature. Some vibrating gyroscopes have positive temperature coefficients, in which a drift voltage increases as the ambient temperature rises. Conversely, some vibrating gyroscopes have negative temperature coefficients, in which a drift voltage decreases as the ambient temperature rises. The gradient of a temperature characteristic differs in each vibrating gyroscope.

It is not desirable that the gradient of a temperature characteristic is large, because the characteristic of a vibrating gyroscope greatly change as the ambient temperature varies. Therefore, the upper and lower limits for a drift voltage are usually specified, and a vibrating gyroscope is determined to be acceptable when its characteristic falls in the specified zone and is determined to be unacceptable if the characteristic is out of the zone. With the use of this method, however, yield of a vibrating gyroscope falls.

SUMMARY OF THE INVENTION

Accordingly, it is the main object of the present invention to provide a method for adjusting the temperature characteristic of a vibrating gyroscope to improve the yield thereof.

The foregoing object of the present invention is achieved through the provision of a method for adjusting the temperature characteristic of a vibrating gyroscope which includes a vibration member and opposing external electrodes formed on outside main surfaces of the vibration member, at least one of which is divided, the method including the step of: removing a part of the opposing external electrodes to adjust capacitances between the opposing external electrodes.

In the method for adjusting the temperature characteristic of a vibrating gyroscope, a part of the external electrodes may be removed such that capacitances between the divided external electrode and the opposing external electrode match.

In the method for adjusting the temperature characteristic of a vibrating gyroscope, a part of the external electrodes may be removed such that capacitances between the divided external electrode and the opposing external electrode have a difference.

In the method for adjusting the temperature characteristic of a vibrating gyroscope, a part of the external electrodes may be removed by a laser trimming, etching, or grinding.

The inventors of the present invention discovered that the temperature characteristic of a vibrating gyroscope has a relation to a capacitance difference between two capacitors formed between divided external electrode and an electrode opposing the divided electrode. The inventors found that the gradient of the temperature characteristic can be reduced by removing a part of an external electrode to eliminate the capacitance difference. The inventors also found that the gradient of the temperature characteristic can be reduced by removing an external electrode to make a capacitance difference, when a vibrating gyroscope has a steep temperature characteristic due to imbalance in an external circuit. An electrode can be removed by laser trimming, etching, and grinding.

According to the present invention, the gradient of the temperature characteristic of the drift voltage of a vibrating gyroscope can be reduced. Therefore, the number of unacceptable products of vibrating gyroscopes can be reduced, and yield of a vibrating gyroscope can be improved.

The foregoing object of the present invention, other objects, features, and advantages will be more clearly understood by the following detailed descriptions of embodiments of the present invention noted by referring to the drawings.

BRIEF DESCRIPTION OF THE DRAWINGS

FIG. 3 is a chart indicating temperature characteristics of the drift voltages of vibrating gyroscopes in a case in which capacitance differences C(L)–C(R) are positive values.

FIG. 4 is a chart indicating temperature characteristics of the drift voltages of vibrating gyroscopes in a case in which capacitance differences C(L)–C(R) are negative values.

DESCRIPTION OF THE PREFERRED EMBODIMENTS

Figure 1:
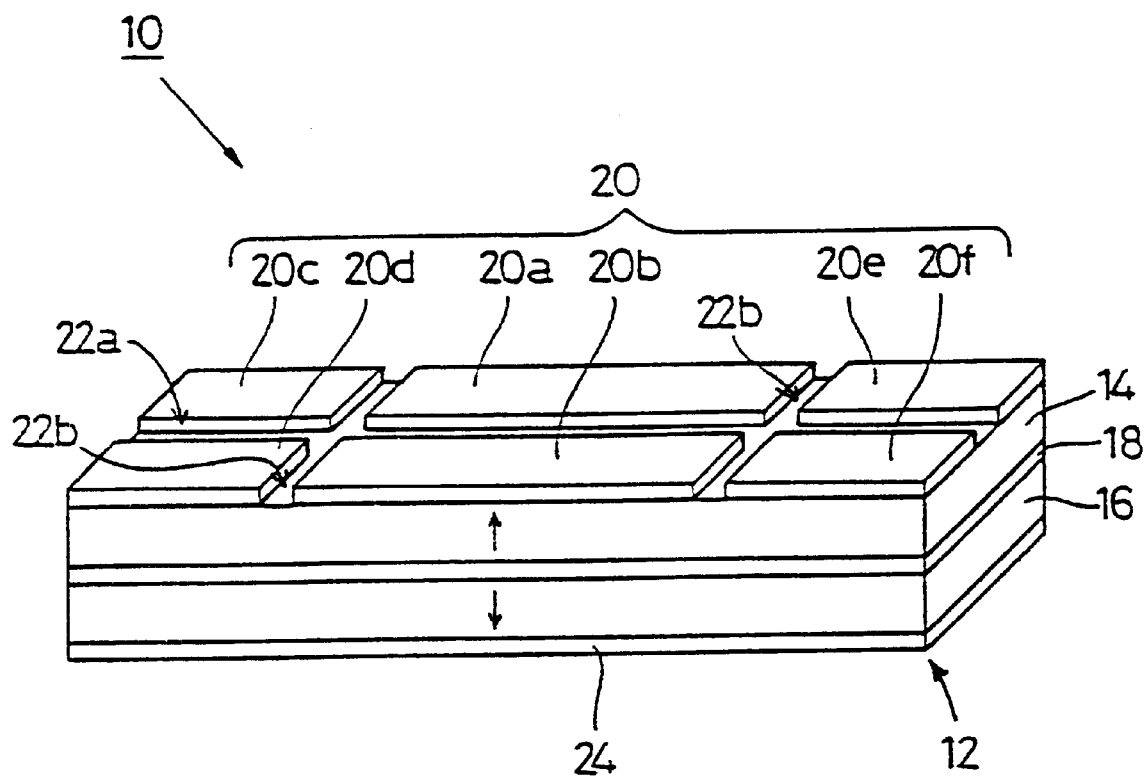
FIG. 1 is a perspective view of a vibrating gyroscope to which an adjustment method of the present invention is applied.

FIG. 1 is a perspective view of a vibrating gyroscope to which an adjusting method according to the present invention is applied. A vibrating gyroscope 10 includes a vibration member 12. The vibration member 12 includes a first piezoelectric substrate 14 and a second piezoelectric substrate 16 both of which are made from, for example, piezoelectric ceramic or a single crystal such as $LiNbO_3$ and $LiTaO_3$. The first piezoelectric substrate 14 and the second piezoelectric substrate 16 are joined by a join layer 18 made from, for example, an epoxy resin, and are polarized in opposite directions to each other in the thickness direction as shown by arrows in FIG. 1. Therefore, the vibration member 12 has a bimorph structure.

On the outside main surface of the first piezoelectric substrate 14, a first external electrode 20 is formed. In the first external electrode 20, a groove 22a extending in the longitudinal direction of the first piezoelectric substrate 14 and grooves 22b extending in the width direction of the first piezoelectric substrate 14 are formed. With these grooves 22a and 22b, the first external electrode 20 is divided into six electrode sections, 20a, 20b, 20c, 20d, 20e, and 20f. On the outside main surface of the second piezoelectric substrate 16, a second external electrode 24 is formed on the whole surface.

To produce such a vibration member 12, for example, two large piezoelectric substrates are joined by a epoxy resin to form laminated substrates, grooves are formed at a certain interval in an external electrode formed on one of the piezoelectric substrates, and laminated substrates are cut by a dicing cutter.

Figure 2:
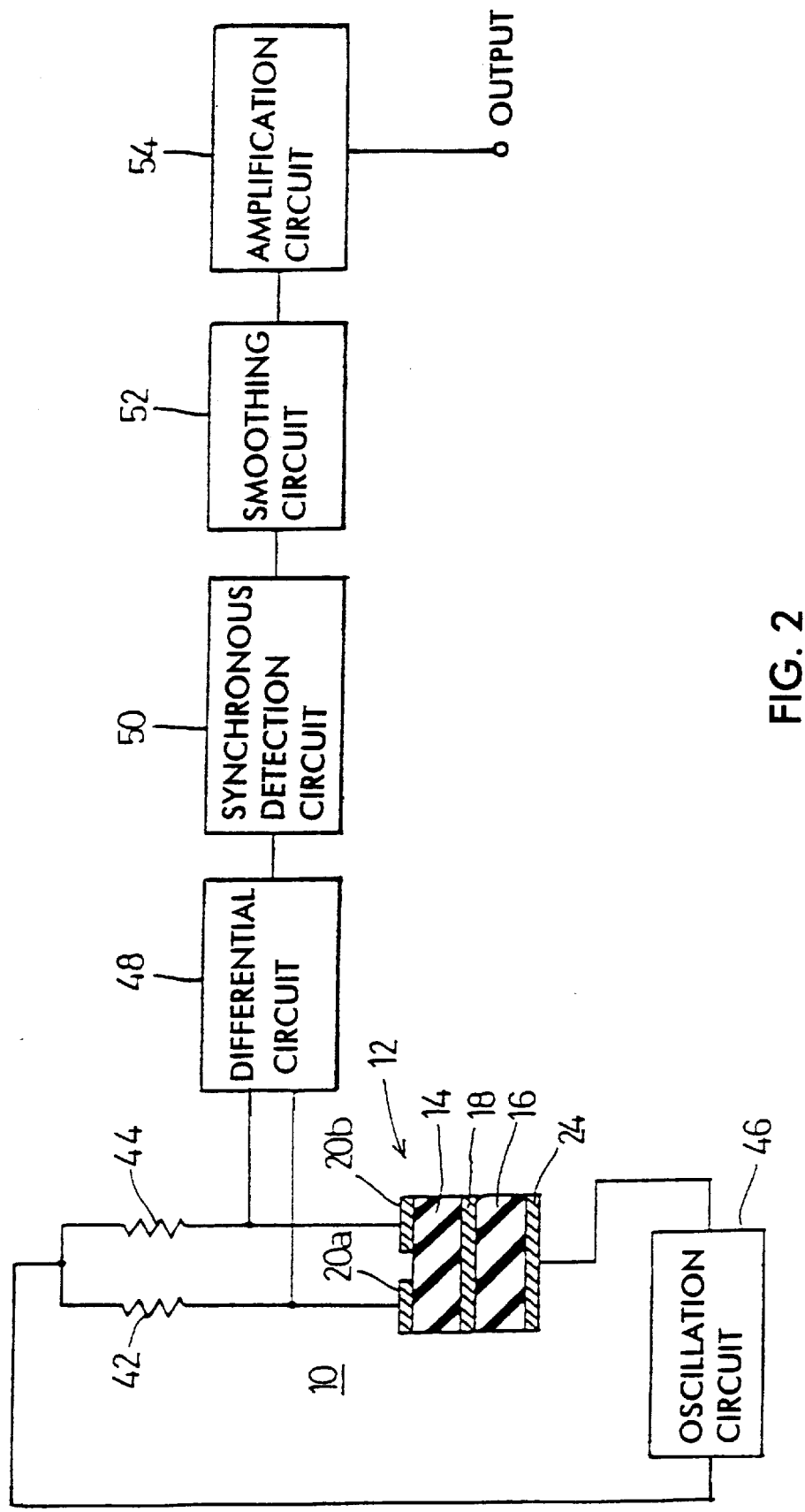
FIG. 2 is a block diagram of circuits for using the vibration gyroscope shown in FIG. 1.

As shown in FIG. 2, to use this vibrating gyroscope 10, resistors 30 and 32 are first connected to two electrode sections 20a and 20b disposed at the center of the first external electrode 20 in the longitudinal direction. An oscillating circuit 34 is connected between the second external electrode 24 and these resistors 30 and 32. The oscillating circuit 34 includes, for example, an amplifying circuit (not shown) and a phase compensation circuit (not shown). A signal output from the second electrode 24 is fed back to the oscillating circuit 34. The level and phase of the feedback signal is adjusted in the amplifying circuit and the phase compensation circuit, and sent to electrode sections 20a and 20b of the first external electrode 20.

Electrode sections 20a and 20b of the first external electrode 20 are connected to the input ends of a differential circuit 36. The output end of the differential circuit 36 is connected to a synchronous detecting circuit 38. The synchronous detecting circuit 38 detects the output signal of the differential circuit 36 in synchronization with, for example, a signal from the oscillating circuit 34. The synchronous detecting circuit 38 is connected to a smoothing circuit 40, and the smoothing circuit 40 is connected to an amplification circuit 42.

The vibrating gyroscope 10 is driven by the oscillating circuit 34 in self-excited oscillation. Since the vibration member 12 has a bimorph structure, when the first piezoelectric substrate 14 extends in the direction parallel to its main surfaces, the second piezoelectric substrate 16 contracts in the direction parallel to its main surfaces. Conversely, when the first piezoelectric substrate 14 contracts in the direction parallel to its main surfaces, the second piezoelectric substrate 16 extends in the direction parallel to its main surfaces. Therefore, the vibration member 12 bends and vibrates in the direction perpendicular to the surfaces on which the first and second external electrodes 20 and 24 are formed.

When the vibrating gyroscope 10 has no rotation angular velocity, signals output from electrode sections 20a and 20b are the same. Since they are offset in the differential circuit 36, the differential circuit 36 does not output a signal. When the vibration member 12 rotates about its axis, a Coriolis force is applied in the direction perpendicular to the direction of bending and vibration. With this Coriolis force, the direction in which the vibration member 12 bends and vibrates changes. Therefore, signals output from electrode sections 20a and 20b change. When a signal output from an electrode section 20a increases, for example, a signal output from an electrode section 20b decreases. Therefore, a difference between the output signals of two electrode sections 20a and 20b can be obtained from the differential circuit 36. Changes in the output signals of electrode sections 20a and 20b correspond to a change in the direction in which the vibration member 12 bends and vibrates, that is, the Coriolis force. Therefore, the differential circuit 36 outputs a signal having the level corresponding to the Coriolis force.

The output signal of the differential circuit 36 is detected by the synchronous detecting circuit 38 in synchronization with a signal from the oscillating circuit 34. The signal detected by the synchronous detecting circuit 38 is smoothed in the smoothing circuit 40 and amplified in the amplification circuit 42. Therefore, by measuring the output signal of the amplification signal 42, the rotation angular velocity which the vibration gyroscope 10 has can be detected.

When the rotation angular velocity has the opposite direction, the direction in which the vibration member 12 bends and vibrates changes conversely, and the output signals of electrode sections 20a and 20b also change conversely. Therefore, a signal output from the differential circuit 36 has the opposite phase and the signal detected by the synchronous detecting circuit 38 also has the opposite polarity. Therefore, the output signal from the amplification circuit 42 has the opposite polarity. From the polarity of the output signal of the amplification circuit 42, the direction of the rotation angular velocity can be detected.

In such a vibrating gyroscope 10, an output signal includes a drift voltage. The drift voltage is preferably low. Even if the drift voltage exists, it is preferred that the drift voltage not change due to a change in temperature. If the drift voltage changes due to a temperature change, it becomes difficult to accurately detect the signal corresponding to a rotation angular velocity. The inventors discovered that the temperature characteristic of the drift voltage has a relation to a capacitance difference between a capacitor C(L) formed between an electrode section 20a of the first external electrode 20 and the second external electrode 24, and a capacitor C(R) formed between an electrode section 20b and the second external electrode 24. FIGS. 3 and 4 are charts produced by measuring the drift voltages of a plurality of vibrating gyroscopes as the temperature is changed, plotting the average values of the drift voltages at each temperature, and drawing lines passing through the plotted points. The lines shown in FIGS. 3 and 4 indicate the temperature characteristic of each vibrating gyroscope. As understood from FIG. 3, when a capacitance difference C(L)–C(R) is larger than zero, the vibrating gyroscopes show negative temperature coefficients, in which the drift voltages decrease according to a temperature increase. As shown in FIG. 4, when a capacitance difference C(L)–C(R) is smaller than zero, the vibrating gyroscopes show positive temperature coefficients, in which the drift voltages increase according to a temperature increase.

Figure 5:
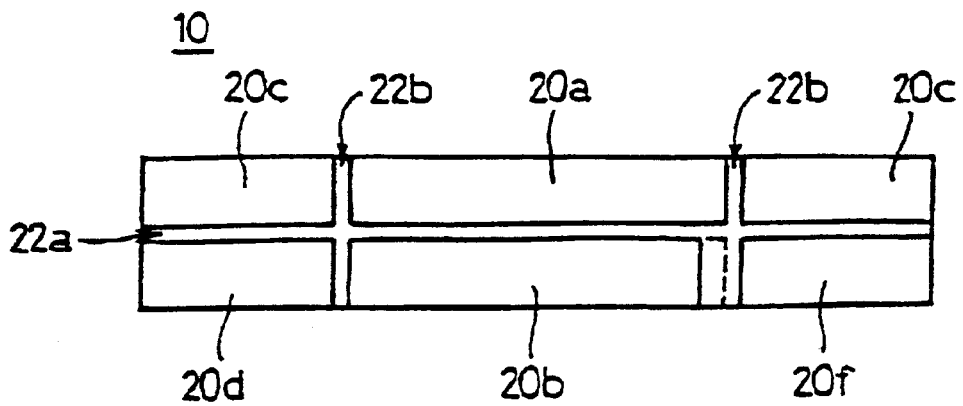
FIG. 5 is a view showing a condition in which a part of an external electrode is removed by etching.
Figure 6:
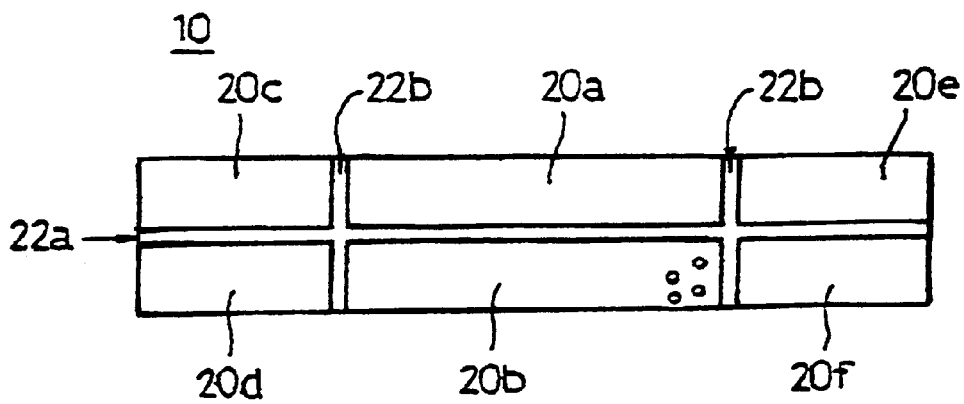
FIG. 6 is a view showing a condition in which a part of an external electrode is removed by laser trimming.
Figure 7:
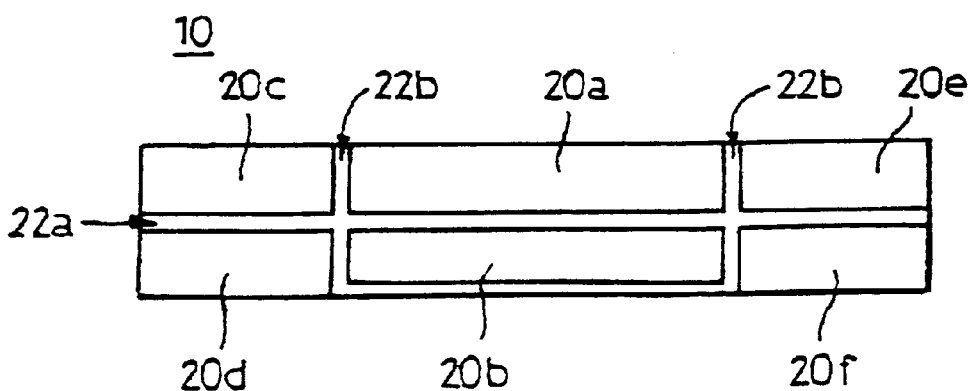
FIG. 7 is a view showing a condition in which a part of an external electrode is removed by grinding.
Figure 8:
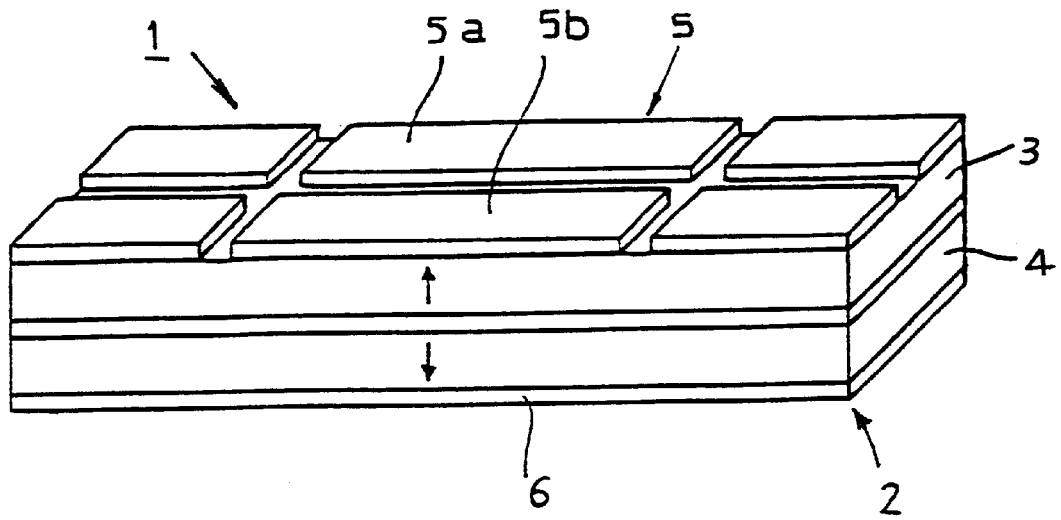
FIG. 8 is a perspective view of a vibrating gyroscope serving as a background of the present invention.
Figure 9:
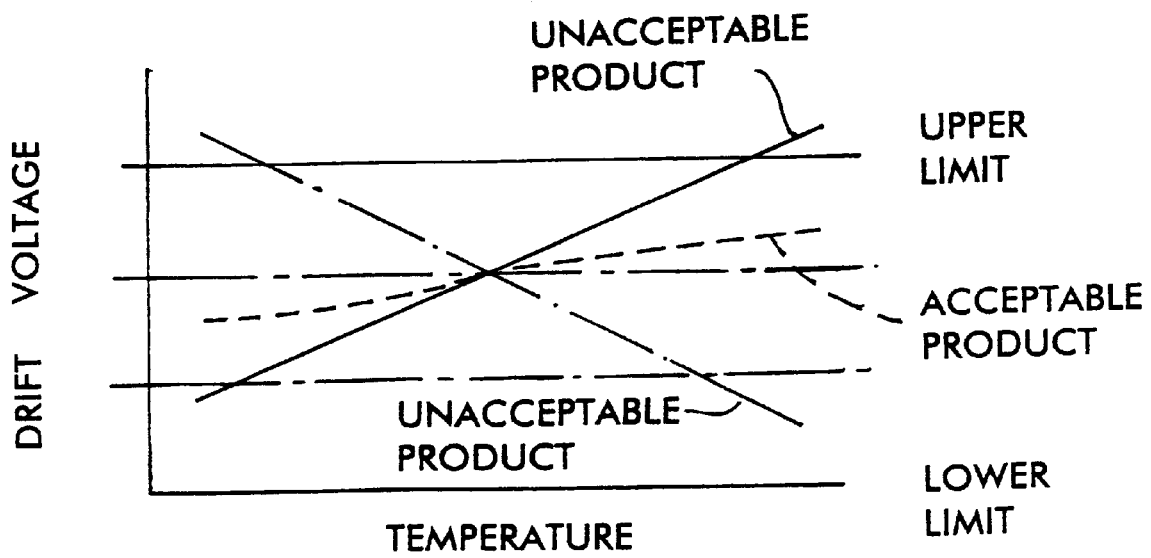
FIG. 9 is a chart indicating temperature characteristics of the drift voltages of vibrating gyroscopes.

To reduce such a capacitance difference, a part of electrode sections 20a or 20b of the first external electrode 20 is removed. Methods for removing part of electrode sections 20a or 20b include, for example, trimming with the use of a laser, etching, and grinding. When etching is used for removal, one end of an electrode section 20b in the longitudinal direction is removed, for example, as shown in FIG. 5. When a laser is used for removal, for example, point-shaped portions in an electrode section 20b are removed as shown in FIG. 6. When grinding is used for removal, one edge of an electrode section 20b in the width direction is removed as shown in FIG. 7.

A part of electrode sections 20a or 20b are removed such that the capacitance difference becomes zero while the capacitances of the two capacitors C(L) and C(R) are measured. A part of an electrode section 20a or an electrode section 20b may be removed such that the output of the differential circuit 36 becomes minimum while the output is monitored. By eliminating the capacitance difference between the external electrodes of the vibrating gyroscope 10, the gradient of the temperature characteristic of the drift voltage can be reduced.

Even when the capacitance difference between the external electrodes of the vibrating gyroscope 10 is small, if circuits driving and detecting the vibrating gyroscope 10 have imbalanced portions, a signal output from the detecting circuit may change due to a temperature change. If resonant points for vibrations in two diagonal directions in the vibration member 12 do not match, the output signal of the vibrating gyroscope 10 may change due to a temperature change. In this case, a part of an electrode section 20a or an electrode section 20b of the first external electrode 20 can be removed according to the temperature characteristic of the output signal in order to reduce the gradient of the temperature characteristic. When the temperature characteristic of the output signal before adjustment has a negative temperature coefficient, for example, the adjustment is made such that the capacitance difference C(L)–C(R) is smaller than zero to reduce the gradient of the temperature characteristic. Conversely, when the temperature characteristic of the output signal before adjustment has a positive temperature coefficient, the adjustment is made such that the capacitance difference C(L)–C(R) is greater than zero to reduce the gradient of the temperature characteristic.

As described above, with the use of an adjustment method of the present invention, the temperature characteristic of the output of the vibration gyroscope is made better. Therefore, the number of unacceptable products of the vibration gyroscopes 10 can be reduced and yield is increased. In the above embodiment, the capacitance between an electrode section 20a of the first external electrode 20 and the second external electrode 24 is called C(L), and the capacitance between an electrode section 20b and the external electrode 24 is called C(R). When the capacitance between an electrode section 20b and the second external electrode 24 is called C(L), and the capacitance between an electrode section 20a and the external electrode 24 is called C(R), the relationship between the polarity of a capacitance difference and the gradient of the temperature characteristic becomes reverse. In other words, there is a relationship between the polarity of a capacitance difference C(L)–C(R) and the gradient of the temperature characteristic. According to that relationship, an electrode to be removed needs to be determined.

In the above vibrating gyroscope 10, only the first external electrode 20 is divided. The second external electrode 24 may also be divided. With such an electrode structure, the vibration member 12 can be bent and vibrated by applying a driving signal between the two electrodes 20 and 24. In this case, the signal corresponding to a rotation angular velocity may be taken out from a division of the first external electrode 20 or a division of the second external electrode 24. A capacitance difference can be adjusted not only by removing a part of a division of the first external electrode 20 but also by removing a part of a division of the second external electrode 24.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for adjusting a temperature characteristic of a vibrating gyroscope which includes a vibration member having opposing external electrodes formed on outside main surfaces of said vibration member, at least one of said external electrodes is divided, said method comprising the step of:

removing a part of at least one of said opposing external electrodes to adjust capacitances between said opposing external electrodes to adjust said temperature characteristic, wherein said divided electrode is divided into at least first and second sections and the capacitances are a first capacitance between the first section and the opposing external electrode and a second capacitance between the second section and the opposing external electrode, and said part of said at least one of said opposing external electrodes is removed such that the first and second capacitances are equal.

2. A method for adjusting a temperature characteristic of a vibrating gyroscope which includes a vibration member having opposing external electrodes formed on outside main surfaces of said vibration member, at least one of said external electrodes is divided, said method comprising the step of:

removing a part of at least one of said opposing external electrodes to adjust capacitances between said opposing external electrodes to adjust said temperature characteristic, wherein said divided electrode is divided into at least first and second sections and the capacitances are a first capacitance between the first section and the opposing external electrode and a second capacitance between the second section and the opposing external electrode, and said part of said at least one of said opposing external electrodes is removed such that the first and second capacitances are unequal.

3. A method for adjusting a temperature characteristic of a vibrating gyroscope according to claim 1 or claim 2, wherein said part of said at least one of said opposing external electrodes is removed by laser trimming, etching, or grinding.

4. A method for adjusting a temperature characteristic of a vibrating gyroscope according to claim 1 or claim 2, wherein said vibration member comprises two piezoelectric substrates joined together, one of said opposing external electrodes being formed on an outer surface of one of said piezoelectric substrates and the other of said opposing external electrodes being formed on an outer surface of the other of said piezoelectric substrates.

5. A method for adjusting a temperature characteristic of a vibrating gyroscope according to claim 4, wherein said divided electrode is divided into a plurality of six sections, a first group of sections on one side of a longitudinal axis of said vibrating member and a second group of sections on an opposite side of said longitudinal axis, and said capacitances are a first capacitance between a center section of said first group of sections and said opposing external electrode and a second capacitance between a center section of said second group of sections and said opposing external electrode.

6. A method for adjusting a temperature characteristic of a vibrating gyroscope in accordance with claim 5, wherein said first and second groups each comprise three sections.

7. A method of adjusting a temperature characteristic of a vibrating gyroscope in accordance with claim 6, wherein said part of said at least one of said opposing external electrodes is removed from at least one of said center sections of said first and second groups of sections.

8. A method for adjusting a temperature characteristic of a vibrating gyroscope in accordance with claim 7, wherein said part of said at least one of said opposing external electrodes is removed by laser trimming, etching or grinding.

9. A method for adjusting a temperature characteristic of a vibrating gyroscope in accordance with claim 6, wherein said part of said at least one of said opposing external electrodes is removed such that said first and second capacitances are equal.

10. A method for adjusting a temperature characteristic of a vibrating gyroscope in accordance with claim 6, wherein said part of said at least one of said opposing external electrodes is removed such that said first and second capacitances are unequal.

11. A method for adjusting a temperature characteristic of a vibrating gyroscope which includes a vibration member having opposing external electrodes formed on outside main surfaces of said vibration member, at least one of said external electrodes is divided, said method comprising the steps of:

measuring said temperature characteristic; and removing a part of at least one of said opposing external electrodes to adjust capacitances between said opposing external electrodes to adjust said temperature characteristic.

12. A method for adjusting a temperature characteristic of a vibrating gyroscope according to claim 11, wherein said temperature characteristic is a change with temperature of a drift voltage of said vibrating gyroscope.

13. A method for adjusting a temperature characteristic of a vibrating gyroscope according to claim 12, wherein said capacitances are adjusted to reduce said change with temperature of said drift voltage.

* * * * *